(12) United States Patent
Senyk

(10) Patent No.: US 6,363,490 B1
(45) Date of Patent: Mar. 26, 2002

(54) METHOD AND APPARATUS FOR MONITORING THE TEMPERATURE OF A PROCESSOR

(75) Inventor: Borys S. Senyk, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/281,632

(22) Filed: Mar. 30, 1999

(51) Int. Cl.$^7$ .............................................. G05B 11/01
(52) U.S. Cl. ...................... 713/300; 702/130; 700/79; 700/204
(58) Field of Search ................. 700/79, 153, 204, 700/202, 46, 278, 286, 295; 331/69, 176; 716/3, 4; 702/130, 132; 713/300, 312; 710/102

(56) References Cited

U.S. PATENT DOCUMENTS

| | | | |
|---|---|---|---|
| 4,432,031 A | 2/1984 | Premerlani | 361/97 |
| 4,442,972 A | 4/1984 | Sahay et al. | 236/1 EA |
| 4,488,824 A | 12/1984 | Salem | 374/181 |
| 4,591,855 A | 5/1986 | Blackburn | 340/870.13 |
| 4,751,405 A | 6/1988 | Bufano, Jr. et al. | 327/106 |
| 4,779,161 A | 10/1988 | DeShazo, Jr. | 361/106 |
| 4,787,007 A | 11/1988 | Matsumura et al. | 361/98 |
| H562 H | 12/1988 | Trachier et al. | |
| 4,789,819 A | 12/1988 | Nelson | 323/314 |
| 4,799,176 A | 1/1989 | Cacciotore | 700/278 |
| 4,807,144 A | 2/1989 | Joehlin | 701/260 |
| RE32,960 E | 6/1989 | Levine | |
| 4,851,987 A | 7/1989 | Day | 713/601 |
| 4,893,097 A | * 1/1990 | Zwack | 331/176 |
| 4,903,106 A | 2/1990 | Fukunaga et al. | 257/378 |
| 4,924,112 A | 5/1990 | Anderson et al. | 326/32 |
| 4,935,864 A | 6/1990 | Schmidt et al. | 363/141 |
| 5,008,771 A | 4/1991 | Palera | 361/103 |
| 5,025,248 A | 6/1991 | Bergeron | 340/596 |
| 5,064,296 A | 11/1991 | Huijsing et al. | 374/163 |
| 5,077,491 A | 12/1991 | Heck et al. | 307/354 |

(List continued on next page.)

FOREIGN PATENT DOCUMENTS

| | | |
|---|---|---|
| EP | 0523736 A1 | 7/1992 |
| EP | 0523736 A1 | 1/1993 |
| EP | 0683558 A1 | 5/1995 |

OTHER PUBLICATIONS

Chin, Shu–Yuan and Chung–Yu Wu, A New Type of Curvature–Compensated CMOS Bandgap Voltage References, VLSITSA, 1991, pp. 398–402.

Ferro, Marco, Franco Salerno and Rinaldo Castello, "A Floating CMOS Bandgap Voltage Reference for Differential Applications", IEEE: Journal of Solid–State Circuits, vol. 24, No. 3, Jun. 1989, pp. 690–697.

Salminen, O. and K. Halonen, "The Higher Order Temperature Compensation of Bandgap Voltage References", IEEE, 1992, pp. 1388–1391.

Allen and Holberg, "CMOS Analog Circuit Design", H.P.W., pp. 539–549, 1987.

Analog Devices, Low Power, Programmable Temperature Controller, pp. 1–16.

Sanchez et al., "Thermal Management System for High Peformance PowerPC Microprocessors", pp. 325–330, 1997.

*Primary Examiner*—William Grant
*Assistant Examiner*—Kidest Bahta
(74) *Attorney, Agent, or Firm*—David J. Kaplan

(57) ABSTRACT

A processor comprises a processing core integrated on the same chip with a temperature sensing diode. The two terminals of the diode are coupled to each of two I-O ports of the processor. In accordance with one embodiment of the present invention, the electrical characteristics across the I-O ports are measured by an external control circuit to calculate a temperature of the processor. This temperature is compared to a threshold, and either an overtemp or undertemp signal is transmitted via a control line.

26 Claims, 3 Drawing Sheets

U.S. PATENT DOCUMENTS

| | | | |
|---|---|---|---|
| 5,085,526 A | 2/1992 | Sawtell et al. | 323/276 |
| 5,087,870 A | 2/1992 | Salesky et al. | 323/276 |
| 5,105,366 A | 4/1992 | Beckey | 700/276 |
| 5,149,199 A | 9/1992 | Kinoshita | 374/178 |
| 5,167,024 A * | 11/1992 | Smith et al. | 713/130 |
| 5,170,344 A | 12/1992 | Berton et al. | 700/90 |
| 5,189,314 A | 2/1993 | Georgiou et al. | 327/114 |
| 5,195,827 A | 3/1993 | Audy et al. | 374/172 |
| 5,253,938 A | 10/1993 | Stixrud | 374/173 |
| 5,255,149 A | 10/1993 | Matsuo | 361/103 |
| 5,283,631 A | 2/1994 | Koerner et al. | 326/173 |
| 5,287,292 A | 2/1994 | Kenny et al. | 702/103 |
| 5,291,607 A | 3/1994 | Ristic et al. | 713/300 |
| 5,325,286 A | 6/1994 | Weng et al. | 360/132 |
| 5,359,234 A | 10/1994 | Atriss et al. | 327/519 |
| 5,359,236 A | 10/1994 | Giordano et al. | 327/512 |
| RE34,789 E | 11/1994 | Fraden | |
| 5,422,832 A | 6/1995 | Moyal | 702/132 |
| 5,440,305 A | 8/1995 | Signore et al. | 341/120 |
| 5,451,892 A | 9/1995 | Bailey | 327/113 |
| 5,453,682 A | 9/1995 | Hinrichs et al. | 324/132 |
| 5,483,102 A * | 1/1996 | Neal et al. | 257/712 |
| 5,485,127 A | 1/1996 | Bertoluzzi et al. | 331/69 |
| 5,490,059 A | 2/1996 | Mahalingaiah et al. | 700/46 |
| 5,560,017 A | 9/1996 | Barrett et al. | 701/260 |
| 5,586,270 A | 12/1996 | Rotier et al. | 701/107 |
| 5,723,998 A | 3/1998 | Saito et al. | 327/513 |
| 5,798,667 A * | 8/1998 | Herbert | 331/176 |
| 5,838,578 A * | 11/1998 | Pippin | 716/4 |
| 5,870,614 A * | 2/1999 | Ang | 713/324 |
| 6,192,479 B1 * | 3/2001 | Ko | 713/300 |

\* cited by examiner

METHOD AND APPARATUS FOR MONITORING THE TEMPERATURE OF A PROCESSOR

The present invention relates to computer systems and more particularly to monitoring processor temperature to trigger clock or voltage throttling in the event of processor overheating.

BACKGROUND

Computer systems, from small handheld electronic accessories to mediumsized mobile and desktop systems to large servers and workstations, are becoming increasingly pervasive in our society. Computer systems typically include one or more processors. A processor manipulates and controls the flow of data in a computer by executing instructions. To provide more powerful computer systems for consumers, processor designers strive to continually increase the operating speed of the processor. As processor speed increases, the power consumed by the processor tends to increase as well. This increase in power consumption typically causes the processor to run hotter. Unfortunately, if the processor overheats, it may be rendered permanently unreliable or inoperable.

To prevent overheating of the processor, also referred to as "overtemp", processor and computer system designers build overtemp prevention mechanisms into their computers. These mechanisms typically include a thermal sensor, such as a thermally sensitive diode or thermocouple, placed on or near the processor package to monitor the temperature of the processor. A threshold temperature is established by the designer, and if the temperature measured by the thermal sensor exceeds this threshold, the processor is placed into a low power mode (or power throttled) until it cools off.

One challenge facing processor and system designers is determining where to position the thermal sensor. Depending on the system configuration, proper placement of the thermal sensor may be difficult. The thermal sensor should be placed close enough to the processor to obtain a rapid, accurate temperature reading and in a manner that does not interfere with the thermal dissipation system. If the thermal sensor is not sufficiently thermally coupled to the processor, a processor overtemp may go undetected by the system, resulting in damage to the processor. To prevent this, designers may simply increase the overtemp threshold guardband, but this may reduce processor efficiency by unnecessarily throttling a processor that may not be in a true overtemp situation.

The present invention addresses this and other problems associated with the prior art.

SUMMARY OF THE INVENTION

A processor comprises a processing core integrated on the same chip with a temperature sensing diode. The two terminals of the diode are coupled to each of two I-O ports of the processor. In accordance with one embodiment of the present invention, the electrical characteristics across the I-O ports are measured by an external control circuit to calculate a temperature of the processor. This temperature is compared to a threshold, and either an overtemp or undertemp signal is transmitted via a control line.

Other features and advantages of the present invention will be apparent from the accompanying figures and the detailed description that follows.

BRIEF DESCRIPTION OF THE DRAWINGS

The present invention is illustrated by way of example and not limitation in the accompanying figures in which like references indicate similar elements and in which.

DETAILED DESCRIPTION

In accordance with one embodiment of the present invention, a computer system includes a processor having a processing core integrated with a temperature sensing diode on a single semiconductor substrate. External input-output (I-O) ports of the processor are coupled to the diode and to a control circuit, external to the processor. The external control circuit operates the diode through the I-O ports, effectively measuring the temperature variant electrical characteristics of the diode in the forward bias region of operation of the diode. Based on the measurement of these electrical characteristics, the temperature of the processor is calculated by the control circuit. This temperature is compared to a threshold, and if the calculated temperature exceeds the threshold, an overtemp signal is transmitted via a control line. Once the calculated temperature falls below the threshold, an undertemp signal is transmitted via a control line.

For one embodiment of the present invention, the processor includes its own throttling circuit. For this embodiment, the control line is coupled to an I-O port of the processor. If an overtemp signal is transmitted from the control circuit via the control line, the throttling circuit places the processor into a low power mode, thereby lowering the temperature of the processor. If an undertemp signal is transmitted, the throttling circuit places the processor back into its normal operating power mode.

For another embodiment of the present invention, the control line is coupled to a voltage regulator and to a clock external to the processor. If an overtemp signal is transmitted from the control circuit via the control line, then the voltage, the clock signal frequency, or both the voltage and frequency are lowered, thereby lowering the power consumption, and hence the temperature, of the processor. If an undertemp signal is transmitted, the voltage, the clock signal frequency, or both the voltage and frequency are raised, thereby placing the processor back into its normal operating power mode. The voltage and frequency may be changed in a particular order. For example, in the case of lowering power consumption, the frequency is reduced first, followed by a voltage reduction. For the case of returning to the normal operating power from a lower power level, the voltage is increased first, followed by a frequency increase. This sequence may be used to keep the processor within its specified operating parameters.

As used herein, the term "throttle" is typically intended to refer to power throttling (i.e. reduction of power consumption), particularly when used in reference to a processor, and is intended to refer to voltage or clock frequency throttling when used in reference to voltage or a clock signal, respectively. A more detailed description of embodiments of the present invention, including various configurations and implementations, is provided below.

Figure 1:
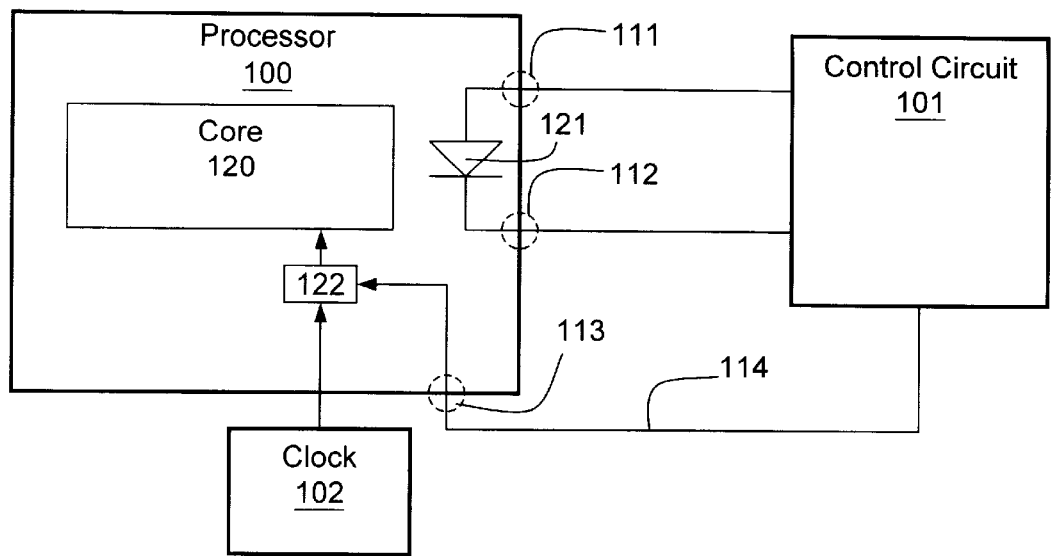
FIG. 1 is a processor in a computer system formed in accordance with an embodiment of the present invention.

FIG. 1 is a processor in a computer system formed in accordance with an embodiment of the present invention. Processor 100 includes processing core 120, temperature sensing diode 121, and clock throttling circuit 122. Processor 100 includes I-O ports 111 and 112 coupled to the anode and cathode terminals of diode 121. Processor 100 also includes I-O port 113 coupled to clock throttling circuit 122. Control circuit 101 is coupled to each of I-O ports 111 and 112. Control circuit 101 is also coupled to I-O port 113 via control line 114. External clock 102 is coupled to processor 100 and, in particular, to clock throttling circuit 122.

Processor 100 of FIG. 1 may be any type of processor of a computer system, including, for example, a conventional processor, a microcontroller, a digital signal processor (DSP), or any other integrated circuit that may be susceptible to overtemp or may otherwise require temperature control. Processing core 120 includes the circuitry that implements the processing functions of processor 100. For example, core 120 may include the functional unit blocks of the processor, such as the floating point unit (FPU), arithmetic logic unit (ALU), or cache. In accordance with one embodiment of the present invention, processing core 120 consumes the majority of power within processor 100 and is therefore most susceptible to overtemp. Processing core 120 is formed on a single, monolithic substrate, which may be a semiconductor material, such as silicon or gallium-arsenide, or an insulative material such as silicon dioxide. This substrate, with or without the integrated circuitry formed thereon, is often referred to as a "chip."

Temperature sensing diode 121 of FIG. 1 is integrated on the same chip as processing core 120. Diode 121 may be integrated on the chip by doping a first region of the chip n-type to form an n-well within a p-substrate. A second region of the chip, within the n-well, is doped p-type. An ohmic contact to each of the two regions forms the positive and negative terminals of the diode. The p-type region is the anode terminal of the diode and the n-well is the cathode terminal of the diode. The anode is positive relative to the cathode in the forward bias region of operation of the diode. Because diode 121 is integrated on the same chip as processing core 120, the diode is very tightly thermally coupled to the heat source of processor 100. In other words, the thermal resistance between processing core 120 and diode 121 is very small. Thus, the heat produced by processor 100 may be quickly and accurately monitored using temperature sensing diode 121. As a result, the overtemp threshold guardband is reduced, the threshold may be raised, and processor operation efficiency is improved because the processor is less likely to be throttled by overtemp.

In addition, because diode 121 of FIG. 1 is integrated on the same chip as processing core 120, diode 121 does not interfere with the thermal dissipation system used to cool processor 100. For example, in accordance with one embodiment of the present invention, to accurately monitor processor temperature, there is no need to compromise the critical thermal interface between the processor core chip and the thermal transfer plate. The thermal interface would be compromised by either interposing a separate, discrete thermal sensing device between the processor and the thermal transfer plate or by cutting a hole in the thermal transfer plate to allow the insertion of a separate, discrete thermal sensing device. As a result, the thermal transfer plate of the thermal dissipation system may be more directly thermally coupled to the processor above, below, or above and below the processor to provide better thermal coupling between the processor and the heat sink.

For one embodiment of the present invention, processor 100 of FIG. 1 includes a package having external, electrical contacts that provide for communication between the processor and external, electrical components. These contacts may be in the form of electrically conductive pins, pads, solder balls, or tabs. Three such contacts are shown in FIG. 1 as I-O ports 111, 112, and 113. I-O ports 111 and 112 are electrically coupled to diode 121 within processor 100.

Control circuit 101 is coupled to I-O ports 111 and 112 of FIG. 1. Control circuit 101 is a component of the computer system that is external to processor 100. For one embodiment of the present invention, control circuit 101 may reside on the same motherboard as processor 100. Control circuit 101 includes circuitry that measures the electrical characteristics across I-O ports 111 and 112. Hence, control circuit 101 measures the electrical characteristics across diode 121. Control circuit 101 uses the measured electrical characteristics (within the range of forward bias current as may be specified by the processor designer) to calculate the temperature of processor 100 as sensed by on-chip diode 121.

For another embodiment of the present invention, measurement of the electrical characteristics across diode 121 of FIG. 1 is done by circuitry in processor 100, and these measurements are then provided, via one or more I-O ports, to external control circuit 101. For an alternate embodiment, measurement of the electrical characteristics across diode 121 and temperature calculation are both done by circuitry in processor 100, and the calculated temperature is then provided, via one or more I-O ports, to external control circuit 101.

Control circuit 101 of FIG. 1 compares the temperature of processor 100, as sensed by on-chip diode 121, to a threshold temperature. This threshold may be set by any number of means. For example, the threshold may be hard-wired into control circuit 101, dynamically set by software, firmware, or micro-code that communicates with control circuit 101, manually set by dip switches, or set by non-volatile memory programming. The method of temperature comparison may be executed by means of a polling algorithm or by comparison hardware. The control circuit may use software, firmware or micro-code to periodically sample or poll the calculated temperature and compare that temperature to the threshold temperature. Alternatively, the temperature comparison can be implemented using a combination of logic gates in hardware.

For one embodiment of the present invention, control circuit 101 of FIG. 1 compares the measured temperature of processor 100 to a single threshold. This single threshold may be associated with the temperature at which processor 100 enters an overtemp condition (plus some guardband). If control circuit 101 determines that the measured temperature exceeds (i.e. is greater than or is equal to or greater than) the threshold, control circuit 101 transmits an overtemp signal via control line 114. An overtemp signal indicates that processor 100 is to be throttled (i.e. placed in a low power mode) to reduce power consumption thereby reducing processor temperature. If control circuit 101 determines that the measured temperature falls below (i.e. is less than or is equal to or less than) the threshold, control circuit 101 transmits an undertemp signal via control line 114. An undertemp signal indicates that processor 100 may resume or continue normal (i.e. unthrottled) operation.

For an alternate embodiment of the present invention, control circuit 101 of FIG. 1 compares the measured temperature of processor 100 to one or more thresholds. For example, a first threshold may be associated with the temperature at which processor 100 enters an overtemp condition (plus some guardband), and a second threshold may be associated with the temperature at which processor 100 enters an undertemp condition. For this embodiment, if control circuit 101 determines that the measured temperature exceeds the first threshold, control circuit 101 transmits an overtemp signal via control line 114. The processor is then throttled until control circuit 101 determines that the measured temperature falls below the second threshold, and control circuit 101 transmits an undertemp signal via control line 114. The second threshold may be lower than the first threshold by a small amount. This embodiment may be found useful to reduce thrashing between normal and low power modes by introducing hysteresis into this control system. In accordance with an alternate embodiment of the present invention, three or more thresholds may be used to, for example, establish intermediate power modes for finer granularity of processor power and temperature control.

External clock 102 of FIG. 1 provides a clock signal to processor 100. The clock signal is used to synchronize the processing and communication of information by processor 100. Clock 102 may be the clock source such as the system clock, or a clock multiplier or other type of clock buffer that receives, processes, and re-transmits a clock signal.

Processor 100 of FIG. 1 includes clock throttling circuit 122 comprising, for example, a phase-locked-loop with output clock control gating circuits, also formed on the same or different chip as processing core 120 and diode 121.

For one embodiment of the present invention, when an overtemp signal is transmitted to processor 100 of FIG. 1 via control line 114 coupled to I-O port 113, the overtemp signal is received by clock throttling circuit 122. In response, clock throttling circuit 122 lowers the clock frequency supplied to processing core 120. Thus, processor 100 is throttled, reducing its temperature. Responsive to an undertemp signal, clock throttling circuit 122 raises the clock frequency back to its normal operating level. For an alternate embodiment of the present invention, processor 100 may include an alternate throttling circuit that, in response to the overtemp signal, freezes or stalls a pipeline within processing core 120, or otherwise lowers the power consumed by processor 100.

Figure 2:
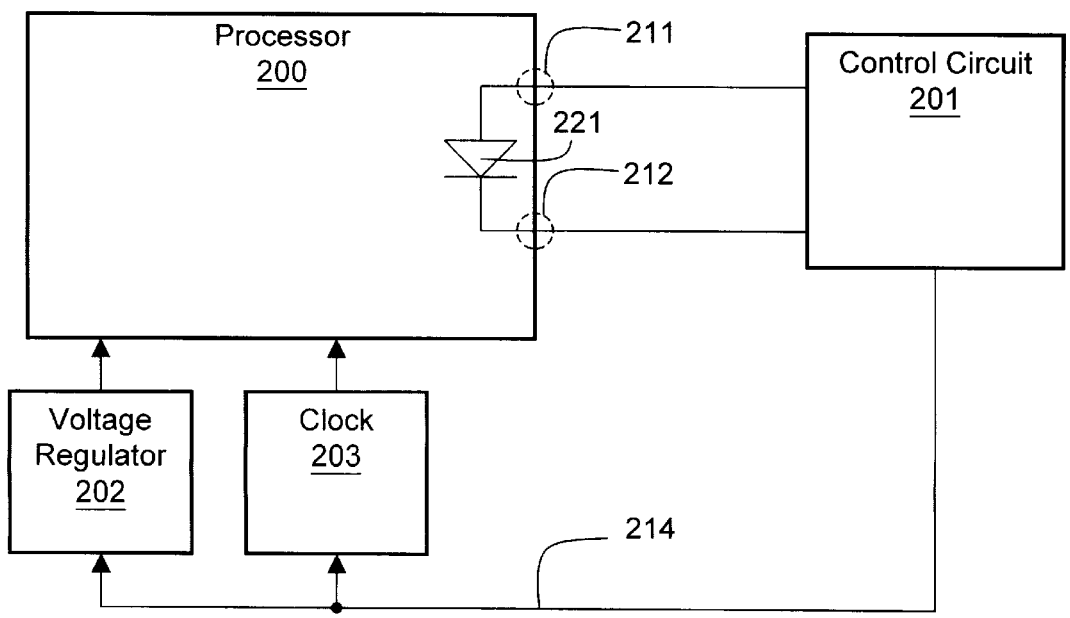
FIG. 2 is a processor in a computer system formed in accordance with an alternate embodiment of the present invention.

FIG. 2 is a processor in a computer system formed in accordance with an alternate embodiment of the present invention. Processor 200 includes temperature sensing diode 221 integrated with a processing core (not explicitly shown) on the same chip. Processor 200 includes I-O ports 211 and 212 coupled to the positive (anode) and negative (cathode) terminals of diode 221. External control circuit 201 is coupled to diode 221 via I-O ports 211 and 212. External voltage regulator 202 and external clock 203 are coupled to processor 200. Control circuit 201 is coupled to voltage regulator 202 and clock 203 via control line 214.

The components and operation of the system of FIG. 2 function in a manner similar to the analogous components and operation of the system of FIG. 1. The primary difference between the systems is that the overtemp and undertemp signals transmitted from control circuit 201 via control signal line 214 are provided to external voltage regulator 202 and external clock 203. In accordance with the embodiment of FIG. 2, throttling of processor 200 is accomplished by throttling either or both of the voltage from voltage regulator 202 or the clock signal from clock 203. For an alternate embodiment of the present invention, a computer system is designed that borrows elements from both FIGS. 1 and 2. For example, for one embodiment, the overtemp and undertemp signals are provided to both the processor and the external voltage regulator or clock to effectuate throttling of the processor to adjust its temperature.

Figure 3:
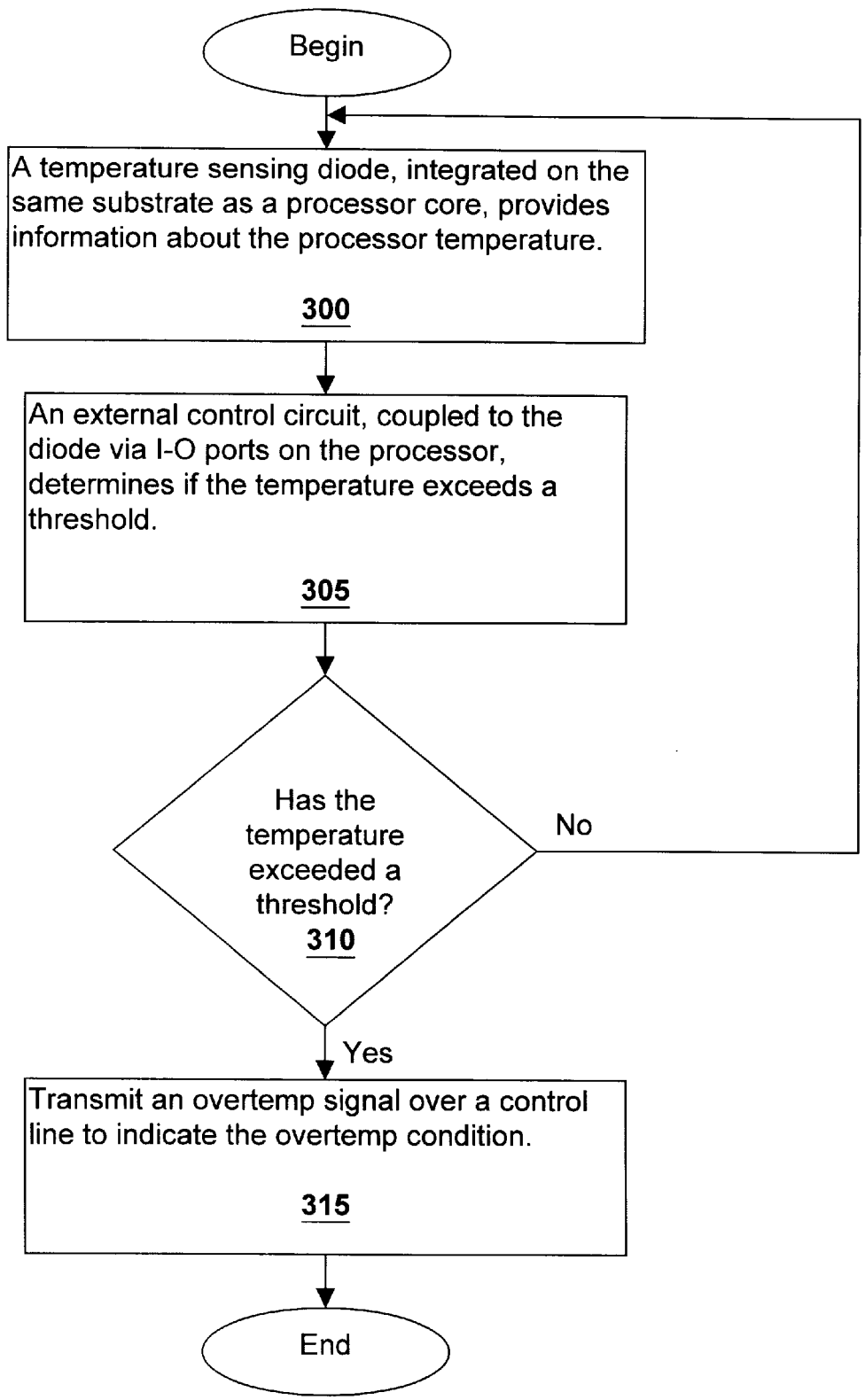
FIG. 3 is a flow chart showing a method of the present invention.

FIG. 3 is a flow chart showing a method of the present invention. At step 300, a temperature sensing diode that is integrated on the same substrate as the processing core of a processor, provides information about the processor's temperature. At step 305, an external control circuit, coupled to the diode via I-O ports on the processor, determines if the processor temperature, as sensed by the diode, exceeds a threshold. At step 310, the process flow is directed back to step 300 if it is determined that the temperature has not exceeded the threshold. Process flow proceeds to step 315 if it is determined that the temperature has exceeded the threshold. At step 315, an overtemp signal is transmitted via a control line to indicate the overtemp condition of the processor. This overtemp signal may then be used by throttling circuitry internal or external to the processor to throttle the power consumed by the processor, thereby lowering processor temperature.

Figure 4:
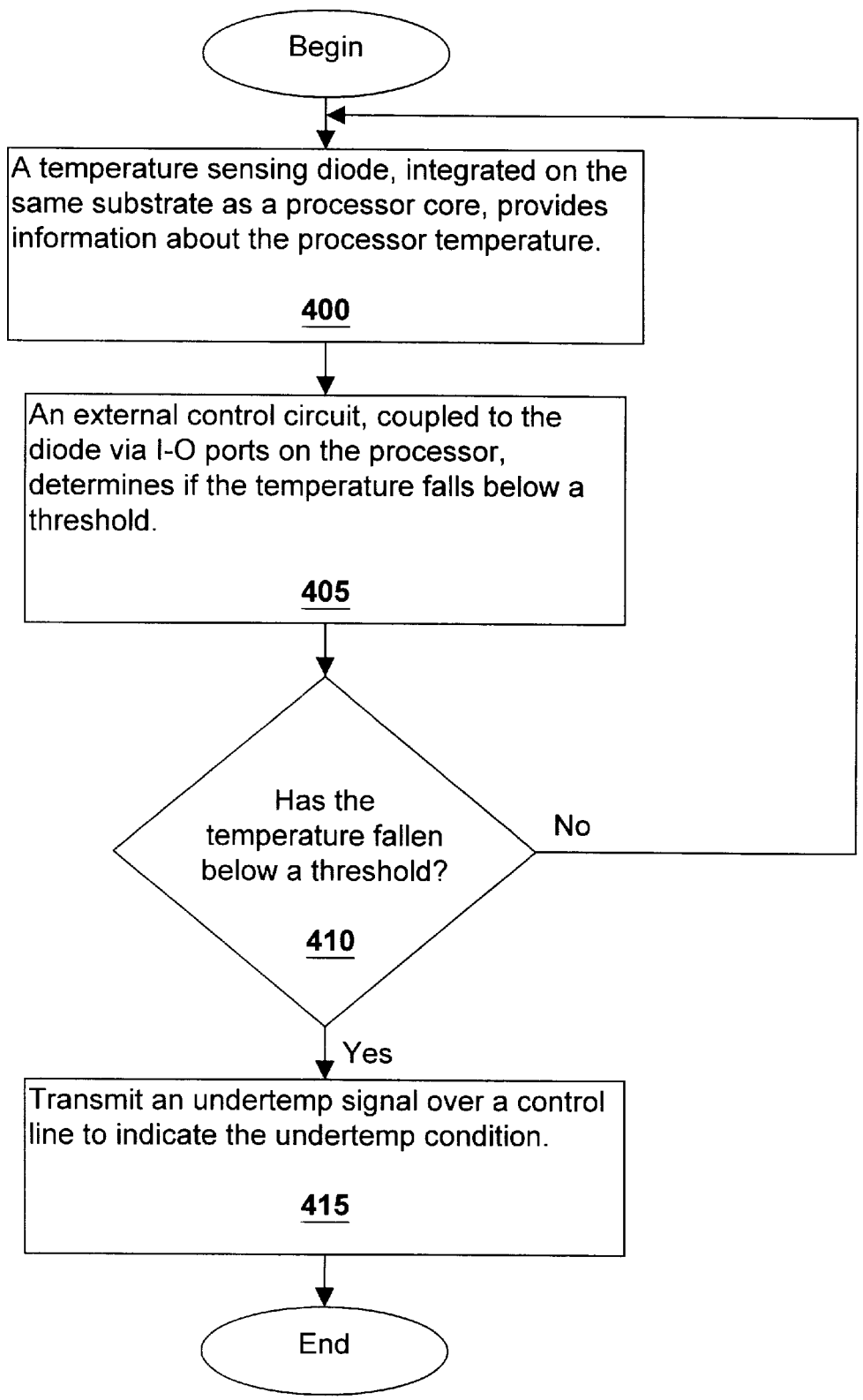
FIG. 4 is a flow chart showing another method of the present invention.

FIG. 4 is a flow chart showing another method of the present invention. At step 400, which typically follows step 315 of FIG. 3, the temperature sensing diode that is integrated on the same substrate as the processing core of the processor, provides information about the processor's temperature. At step 405, an external control circuit, coupled to the diode via I-O ports on the processor, determines if the processor temperature, as sensed by the diode, falls below a threshold. The threshold of step 405 may be the same or a different threshold than the threshold of steps 305 and 310 of FIG. 3. At step 410, the process flow is directed back to step 400 if it is determined that the temperature has not fallen below the threshold. Process flow proceeds to step 415 if it is determined that the temperature has fallen below the threshold. At step 415, an undertemp signal is transmitted via the control line to indicate the undertemp condition of the processor. This undertemp signal may then be used by throttling circuitry internal or external to the processor to return the processor to normal operation.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A processor comprising:
   a chip having a processing core integrated thereon;
   a thermal sensor integrated on the chip, the thermal sensor having first and second terminals;
   a first external I-O port coupled to the first terminal for connection to an external control circuit; and
   a second external I-O port coupled to the second terminal for connection to the external control circuit.

2. The processor of claim 1, further comprising:
   a third external I-O port; and
   a clock throttling circuit integrated on the chip to adjust a frequency of a clock signal supplied to the core in response to a signal received at the third port from the external control circuit.

3. The processor of claim 2, wherein the clock throttling circuit includes a phase locked loop.

4. The processor of claim 3, wherein the clock throttling circuit includes an output clock control gating circuit.

5. The processor of claim 1, further comprising:
   a third external I-O port; and
   a throttling circuit integrated on the chip to place the processor into a low power mode in response to a signal received at the third port from the external control circuit.

6. The processor of claim 1, wherein the thermal sensor comprises a semiconductor device formed in the semiconductor substrate of the chip and wherein the first and second external I-O ports are coupled to opposite sides of the semiconductor device.

7. The processor of claim 1, further comprising:
a third external I-O port; and
a throttling circuit integrated on the chip to first place the processor into a low power mode in response to a signal received at the third port from the external control circuit and to second adjust a frequency of a clock signal supplied to the core in response to a signal received at the third port from the external control circuit.

8. The processor of claim 1, further comprising:
a third external I-O port; and
a throttling circuit integrated on the chip to first place the processor into a normal power mode in response to a signal received at the third port from the external control circuit and to second adjust a frequency of a clock signal supplied to the core in response to a signal received at the third port from the external control circuit.

9. The processor of claim 1, wherein the first and second external I-O ports comprise electrically conductive pins.

10. A computer system comprising:
a processor having a processing core integrated with a thermal sensor on a substrate;
a control circuit, external to the processor, coupled to the thermal sensor, to determine if a temperature of the processor, as sensed by the thermal sensor, exceeds a threshold; and
a control line coupled to the control circuit to transmit a signal that indicates if the temperature exceeds the threshold.

11. The computer system of claim 10, wherein the control line is coupled to the processor, and the processor includes a throttling circuit responsive to the signal.

12. The computer system of claim 10, further comprising a clock, external to the processor, coupled to the processor and to the control line, to adjust a frequency of a clock signal supplied to the processor in response to the signal.

13. The computer system of claim 10, further comprising a voltage regulator, external to the processor, coupled to the processor and to the control line, to adjust a voltage supplied to the processor in response to the signal.

14. The computer system of claim 12, further comprising a voltage regulator, external to the processor, coupled to the processor and to the control line, to adjust a voltage supplied to the processor in response to the signal.

15. The computer system of claim 10, wherein the thermal sensor comprises a semiconductor device formed in the substrate of the processor and wherein the external control circuit is coupled to opposite sides of the semiconductor device.

16. The computer system of claim 10, wherein the external control circuit measures the electrical characteristics of the thermal sensor to determine a temperature of the processor.

17. The computer system of claim 10, further comprising circuitry in the processor for measuring electrical characteristics of the thermal sensor and providing the measurements to the external control circuit.

18. The computer system of claim 10, further comprising a throttling circuit coupled to the control line to first place the processor into a low power mode in response to a signal received at the control line and to second adjust a frequency of a clock signal supplied to the core in response to a signal received at the control line.

19. A method of monitoring a temperature of a processor comprising:
measuring electrical characteristics across first and second external I-O ports of the processor, the first and second external I-O ports being coupled to a device integrated with a processing core on a chip of the processor;
calculating the temperature based on the electrical characteristics;
comparing the temperature to a first threshold; and
transmitting an overtemp signal to the processor via a control line if the temperature exceeds the first threshold.

20. The method of claim 19, further comprising transmitting an undertemp signal to the processor via the control line if the temperature falls below a second threshold.

21. The method of claim 19, further comprising reducing a frequency of a clock signal in response to receiving the overtemp signal.

22. The method of claim 20, further comprising:
reducing a frequency of a clock signal in response to receiving the overtemp signal; and
increasing the frequency of the clock signal in response to receiving the undertemp signal.

23. The method of claim 20, further comprising:
reducing a voltage supplied to the processing core in response to receiving the overtemp signal; and
increasing the voltage supplied to the processing core in response to receiving the undertemp signal.

24. The method of claim 19, wherein measuring the electrical characteristics includes measuring the electrical characteristics of a diode integrated on the chip.

25. The method of claim 19, further comprising:
first placing the processor into a low power mode in response to receiving the overtemp signal; and
second adjusting a frequency of a clock signal supplied to the core in response to receiving the overtemp signal.

26. The method of claim 19, further comprising:
first placing the processor into a normal power mode in response to receiving the undertemp signal; and
second adjusting a frequency of a clock signal supplied to the core in response to receiving the undertemp signal.

* * * * *